Patented Aug. 24, 1937

2,091,180

UNITED STATES PATENT OFFICE 2,091,180

PROCESS FOR TREATING PAPER PRODUCTS

Paul La Frone Magill, Niagara Falls, N. Y., assignor to E. I. du Pont de Nemours & Company, Wilmington, Del., a corporation of Delaware No Drawing. Application October 20, 1933, Serial No. 694,523

16 Claims. (Cl. 91—70)

This invention relates to the impregnation or coating of fibrous or porous materials with wax-resin mixtures and in particular relates to the impregnation and coating of paper products with paraffin wax-dihydronaphthalene resin mixtures.

Various waxes, and paraffin wax in particular, have been used in many waterproofing and similar processes. Paraffin wax as an application to paper has not been satisfactory in all respects. Paraffin wax is too soft for many purposes and imparts to the treated object a greasy feel. Further, since the index of refraction of the paraffin wax is considerably lower than the index of refraction of cellulose fibers, a completely transparent paper cannot be produced by applying paraffin wax alone to a suitable paper base.

An object of this invention is to treat cellulosic materials with a composition having substantially the same index of refraction as cellulose thereby producing a paper which is more transparent than those produced by using paraffin alone. A further object of this invention is to treat paper with a paraffin composition which is harder and which has a higher softening point than pure paraffin. A still further object of this invention is to produce a translucent paper product having a high gloss. Other objects will be apparent from the following description of my invention.

I have found that cellulosic materials treated with a composition containing a wax and a wax soluble resin have new and desirable properties. I have further found that paper products impregnated or coated with a composition containing paraffin wax and the resin produced by polymerizing or condensing dihydronaphthalene have new and distinctive properties. If I desire to produce a paper product which has a high gloss, a hard surface and which is waterproof, I treat the paper with a composition containing a high percentage of the resin. If I desire a paper product which is highly transparent, I treat the paper with a composition containing approximately 3 parts of dihydronaphthalene resin and 2 parts of paraffin since I have found that a composition containing this resin and paraffin in these proportions has substantially the same index of refraction as cellulose. On the other hand, if I desire to produce a paper product which has the characteristics of paraffin paper, but in which the coating or impregnating material has a higher softening point than that of pure paraffin, I use a relatively small amount of the resin dissolved in paraffin.

My composition can be applied to paper by any of the well known processes for making wax paper or by any process suitable for coating or impregnating porous articles. For example, I may dissolve the resin or both resin and paraffin in a solvent, for example benzene, and apply it to paper by brushing or dipping and then allow the solvent to evaporate. I can also coat or impregnate paper by applying the resin composition to the paper as a powder or I can impregnate the paper with a molten resin-wax mixture, for example by dipping the paper in the molten mixture. When the composition is applied as a powder, I prefer to subject the treated paper to heat to melt the resin composition.

The paper impregnated by any of the above described processes may be further treated by heating to melt the resin-wax composition to assist in causing the resin-wax composition to penetrate deeper into the fiber. Such heat treatment may be followed by rapid cooling to increase the transparency and luster of the product. If desired, the impregnated or coated paper may be subjected to pressure by a rolling or calendering operation.

In applying my compositions to the thicker types of paper products, for example cardboard, transparency ordinarily is of no importance and I may immerse the paper in a molten resin-paraffin mixture and allow it to cool slowly. In this process the paper is covered with an opaque coating which if the percentage of resin is high, for instance 50% or higher, will have none of the soft, greasy characteristics of paraffin but will have a white, opaque, enamel-like finish.

One process for preparing a dihydronaphthalene resin suitable for my composition is as follows:

Two moles (256 grams) of naphthalene, dissolved in 1000 c. cs. of dimethyl ether of ethylene glycol purified with sodium, is treated with 2 moles (46 grams) of sodium by immersing the sodium contained in a wire screen basket into the naphthalene-ether solution. The solution is maintained under an atmosphere of nitrogen at a temperature of about —30° C. and is agitated while the sodium is dissolving. The sodium dissolves with the formation of a green colored solution indicating the formation of a sodium naphthalene compound. After substantially all of the sodium is dissolved, water is added slowly while maintaining the temperature at about 15° C. until the green color disappears. At the end of this treatment, the solution contains approximately 1 mole of naphthalene, 1 mole of dihydronaphthalene and precipitated sodium hydroxide.

This mixture is treated at about 30° C. with 2 more moles (46 grams) of sodium to react with the remaining naphthalene. However, as the sodium dissolves, the characteristic green color of sodium naphthalene ether solvent turns to a brown or red color. After the sodium is dissolved, the solution is allowed to stand overnight to complete the polymerization. Water is then slowly added until the brown color is discharged.

The solution is filtered to remove the sodium hydroxide and the material on the filter is washed with fresh dimethyl ether of ethylene glycol. The filtrates are combined and distilled until about one half of the solvent has been removed. At this stage the solution may be decolorized by a solid decolorizing agent, for example, fuller's earth or decolorizing charcoal. The decolorizing agent, if used, is filtered out and the filtrate is distilled to recover the remainder of the ether solvent. After the solution has been removed, the distillation is continued under a vacuum of 7 to 8 millimeters of mercury pressure until all of the material distilling below 225° at this pressure has been removed. The residue remaining in the still is the dihydronaphthalene resin.

The resin can be prepared by other processes, for instance the dihydronaphthalene and sodium naphthalene can be prepared separately and reacted at room temperature in a suitable ether solvent such as the dimethyl ether of ethylene glycol. The polymer formed can then be converted to the resin by treating the solution with water or other hydrolyzing agent such as alcohol.

The resin is a clear, light colored, fluorescent, brittle material which melts to a clear liquid at 97° to 103° C. The molecular weight of the resin varies from 400 to 560 as determined by boiling point methods using benzene as a solvent. This resin is readily soluble in molten paraffin, benzene, xylene, gasolene and other hydrocarbons, carbon tetrachloride, acetone, ethyl acetate, diethyl ether and dimethyl ether of ethylene glycol. The resin is substantially insoluble in alcohol and is insoluble in water. The refractive index of the resin at room temperature is approximately 1.60 and the specific gravity is about 1.2.

Since the paraffin and the resin are soluble in all proportions my compositions are easily prepared by heating any mixture of resin and parffin to such a temperature that a clear liquid is formed. A mixture of paraffin containing a small amount of resin has characteristics of a modified paraffin when slow cooling is employed. The opacity and melting point of the paraffin increases with an increase in the amount of resin added. A composition containing 50% wax and 50% resin when slowly cooled has the appearance of an opaque enamel and the soft, greasy characteristics of the paraffin have entirely disappeared. On increasing the percentage of resin still higher, the hardness of the composition increases. Compositions containing 80% or more resin are somewhat brittle, with a glass-like fracture and have a high gloss.

My invention is not limited to the treatment of paper but can be applied to any fibrous or porous material, for example felts of animal or vegetable fibers, porous inorganic materials or wood.

Further, my invention is not restricted to treating fibrous or porous materials with dihydronaphthalene resins since homologous dihydronaphthalene resins are equally applicable. For example, alphamethyl dihydronaphthalene or betamethyl dihydronaphthalene can be prepared by the method described herein for preparing dihydronaphthalene. These dihydro compounds (which are homologues of dihydronaphthalene) may be converted into resins by the herein described method, namely, by reacting them at suitable temperatures with sodium compounds of naphthalene or naphthalene homologues. The properties of such resins made from the homologues of dihydronaphthalene are similar to those of dihydronaphthalene resin; they are soluble in molten paraffin and in other hydrocarbons.

In the appended claims, I use the term "dihydronaphthalene homologue resin" to include dihydronaphthalene resin and resins made by the herein described method from homologues of dihydronaphthalene.

I claim:

1. A process comprising treating a fibrous material with a substantially homogeneous composition comprising paraffin wax and polymerized dihydronaphthalene resin.

2. A process comprising impregnating paper with a substantially homogeneous composition comprising paraffin wax and polymerized dihydronaphthalene resin having a molecular weight not less than about 400.

3. A process comprising impregnating paper with a substantially homogeneous composition comprising paraffin wax and a polymerized dihydronaphthalene homologue resin having a molecular weight not less than about 400.

4. A process comprising coating paper by immersing the paper in a substantially homogeneous composition comprising paraffin wax and polymerized dihydronaphthalene resin having a molecular weight not less than about 400.

5. A process comprising treating paper with a composition comprising a solvent in which is dissolved paraffin wax and a polymerized dihydronaphthalene resin having a molecular weight not less than about 400 and thereafter evaporating the solvent.

6. A process comprising treating paper by coating the paper with powdered paraffin wax-polymerized dihydronaphthalene resin composition and thereafter subjecting the coated paper to a temperature sufficient to melt said composition.

7. A process for treating cellulose fibers comprising treating said fibers with a substantially homogeneous composition comprising paraffin wax and polymerized dihydronaphthalene resin having a molecular weight not less than about 400 in such proportions that the refractive index of the mixture of wax and resin is substantially equal to the refractive index of the cellulose fiber.

8. An article of manufacture comprising paper impregnated with a substantially homogeneous composition containing paraffin wax and polymerized dihydronaphthalene resin.

9. An article of manufacture comprising paper coated with a substantially homogeneous composition containing paraffin wax and a polymerized dihydronaphthalene resin having a molecular weight not less than about 400.

10. An article of manufacture comprising paper impregnated with a solid solution of paraffin wax and a polymerized dihydronaphthalene resin having a molecular weight not less than about 400 in such proportions that the refractive index of the wax-resin composition is substantially equal to the refractive index of the paper fiber.

11. An article of manufacture comprising paper impregnated with paraffin wax and a polymerized dihydronaphthalene homologue resin dissolved therein in such proportions that the refractive index of the wax-resin solution is substantially equal to the refractive index of the paper fiber.

12. A substantially transparent sheet comprising a paper web coated with a solid solution of 2 parts of paraffin wax and approximately 3 parts by weight of a polymerized dihydronaphthalene resin having a molecular weight not lower than about 400.

13. A process for producing a transparent sheet material comprising impregnating a paper web with molten paraffin wax having dissolved therein approximately 1.5 parts by weight of a polymerized dihydronaphthalene resin having a molecular weight not lower than about 400.

14. A method for coating a surface of fibrous material which comprises coating said material with a molten mixture of dihydronaphthalene polymer resin and paraffin wax and rapidly cooling the coated material to a point below the melting point of said mixture.

15. A process comprising coating paper with a molten mixture of paraffin wax and a dihydronaphthalene polymer resin and rapidly cooling the coated paper to a temperature below the melting point of said mixture.

16. A paper web coated with a mixture comprising paraffin wax blended with at least 50% by weight of a dihydronaphthalene polymer resin, said coated web having a glossy, enamel-like appearance.

PAUL LA FRONE MAGILL.